(12) United States Patent
Hoffmann et al.

(10) Patent No.: US 8,668,027 B2
(45) Date of Patent: Mar. 11, 2014

(54) POWER TOOL

(75) Inventors: Joachim Hoffmann, Plochingen (DE);
Stefan von Siegroth, Fellbach (DE)

(73) Assignee: Andreas Stihl AG & Co. KG,
Waiblingen (DE)

(*) Notice: Subject to any disclaimer, the term of this patent is extended or adjusted under 35 U.S.C. 154(b) by 659 days.

(21) Appl. No.: 12/437,642

(22) Filed: May 8, 2009

(65) Prior Publication Data

US 2009/0283286 A1 Nov. 19, 2009

(30) Foreign Application Priority Data

May 16, 2008 (DE) .................... 10 2008 023 927

(51) Int. Cl.
*E21B 3/00* (2006.01)
*E21B 17/22* (2006.01)
*E21B 19/16* (2006.01)
*E21B 19/18* (2006.01)

(52) U.S. Cl.
USPC ........................................................ 173/215

(58) Field of Classification Search
USPC ........................................ 173/215; 227/175.1
See application file for complete search history.

(56) References Cited

U.S. PATENT DOCUMENTS

| | | | |
|---|---|---|---|
| 3,194,284 A | 7/1965 | Walker | |
| 3,839,920 A * | 10/1974 | Mulvany et al. | 474/114 |
| 4,544,090 A * | 10/1985 | Warman et al. | 227/131 |
| 4,635,928 A * | 1/1987 | Ogden et al. | 482/54 |
| 4,721,170 A * | 1/1988 | Rees | 173/13 |
| 4,977,708 A * | 12/1990 | Kloft | 451/359 |
| 5,241,946 A * | 9/1993 | Yelton et al. | 125/14 |
| 5,351,809 A * | 10/1994 | Gilmore et al. | 198/812 |
| 5,381,780 A * | 1/1995 | Yelton et al. | 299/39.3 |
| 5,400,721 A * | 3/1995 | Greene | 108/147 |
| 5,730,561 A * | 3/1998 | Wambeke | 408/118 |
| 6,196,940 B1 * | 3/2001 | Lehtovaara | 474/112 |
| 7,101,295 B2 * | 9/2006 | Taomo et al. | 474/117 |
| 7,322,506 B2 * | 1/2008 | Forster | 227/133 |
| 7,390,276 B2 * | 6/2008 | Tryphonos | 474/109 |
| 7,503,401 B2 * | 3/2009 | Gross et al. | 173/131 |
| 7,726,536 B2 * | 6/2010 | Gross et al. | 227/134 |
| 2004/0033852 A1 * | 2/2004 | Taomo et al. | 474/101 |
| 2004/0168555 A1 | 9/2004 | Donovan et al. | |
| 2005/0148415 A1 * | 7/2005 | Hartley | 474/8 |
| 2005/0217873 A1 * | 10/2005 | Gross et al. | 173/1 |
| 2005/0218177 A1 * | 10/2005 | Berry et al. | 227/8 |
| 2005/0218178 A1 * | 10/2005 | Berry et al. | 227/8 |

(Continued)

FOREIGN PATENT DOCUMENTS

| | | |
|---|---|---|
| CN | 2035700 U | 4/1989 |
| GB | 2226782 A | 7/1990 |

*Primary Examiner* — Robert Long
(74) *Attorney, Agent, or Firm* — Gudrun E. Huckett

(57) ABSTRACT

A power tool with a drive motor and a drive belt guided about a drive pulley and an output pulley has a tool driven by the drive motor through the drive belt. A tensioning device is provided that changes a spacing between the drive pulley and the output pulley and has at least one tensioning position and at least one release position. In the at least one tensioning position, the drive pulley and the output pulley have a first spacing relative to one another and in the at least one release position have a second spacing to one another that is smaller than the first spacing. The drive belt is an elast belt and the tensioning device, as a result of inherent tension of the elast belt, is secured in the at least one tensioning position.

21 Claims, 5 Drawing Sheets

(56) References Cited

U.S. PATENT DOCUMENTS

| | | | |
|---|---|---|---|
| 2005/0218180 A1* | 10/2005 | Gross et al. | 227/130 |
| 2005/0218181 A1* | 10/2005 | Gross et al. | 227/130 |
| 2005/0218182 A1* | 10/2005 | Berry et al. | 227/131 |
| 2005/0218183 A1* | 10/2005 | Berry et al. | 227/131 |
| 2005/0218184 A1* | 10/2005 | Buck et al. | 227/131 |
| 2005/0218185 A1* | 10/2005 | Kenney et al. | 227/133 |
| 2005/0218186 A1* | 10/2005 | Forster | 227/133 |
| 2005/0224552 A1* | 10/2005 | Berry et al. | 227/131 |
| 2005/0233864 A1* | 10/2005 | Smith et al. | 482/52 |
| 2006/0178097 A1* | 8/2006 | Crover | 451/311 |
| 2007/0102471 A1* | 5/2007 | Gross et al. | 227/131 |
| 2008/0047999 A1* | 2/2008 | Berry et al. | 227/7 |
| 2008/0308603 A1* | 12/2008 | Shelton et al. | 227/175.1 |
| 2008/0308604 A1* | 12/2008 | Timm et al. | 227/175.1 |
| 2008/0312048 A1* | 12/2008 | Cassano | 482/54 |
| 2010/0146797 A1* | 6/2010 | Dreher | 30/228 |
| 2010/0163263 A1* | 7/2010 | Grygorowicz | 173/170 |

\* cited by examiner

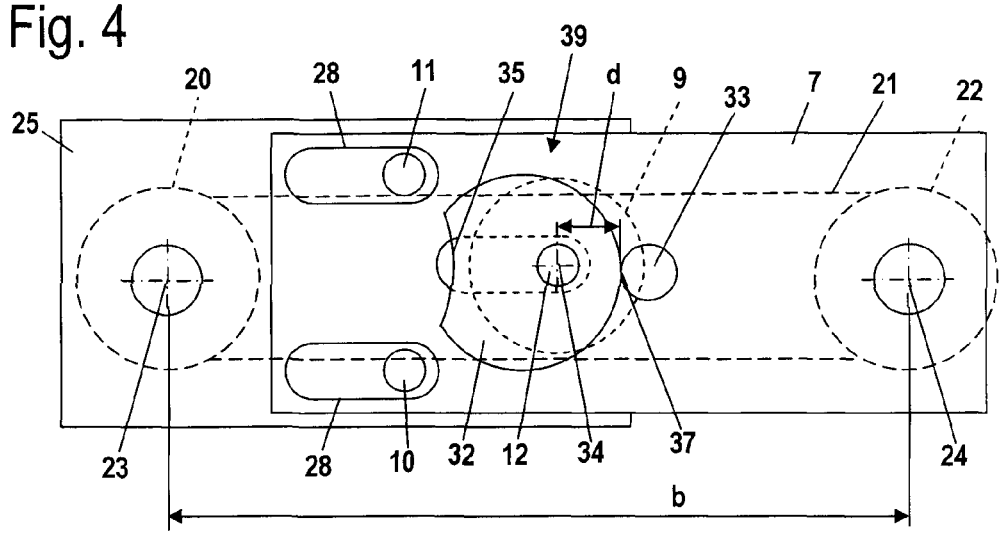
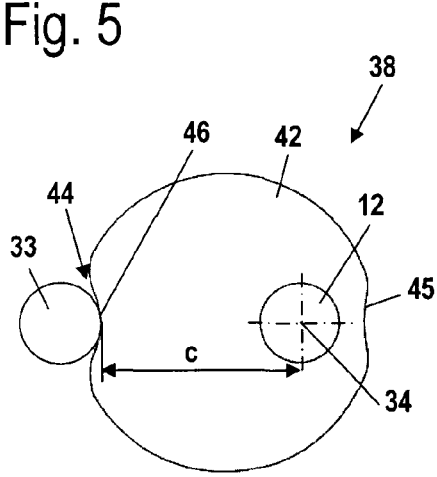
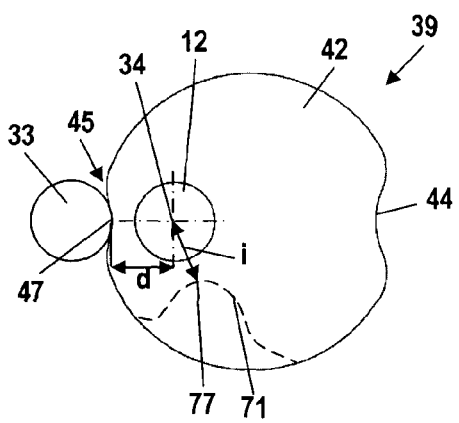
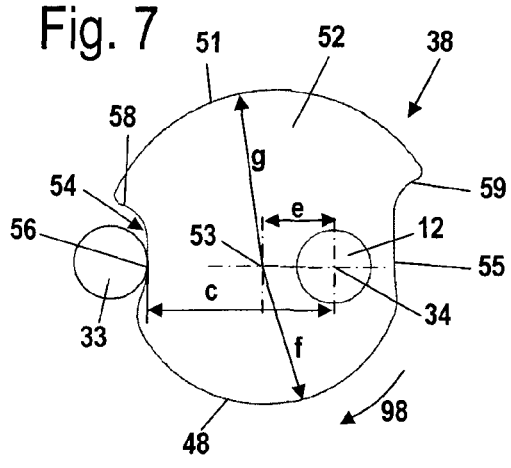
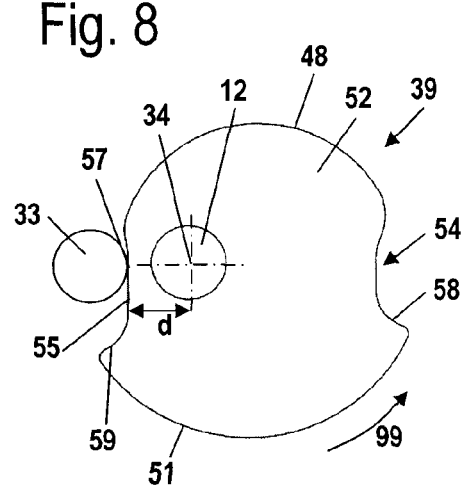

POWER TOOL

BACKGROUND OF THE INVENTION

The invention concerns a power tool wherein the tool is driven by a drive motor be means of a belt. The belt is guided about a drive pulley and an output pulley. A tensioning device is provided for the belt with which the spacing between the drive pulley and the output pulley can be changed, wherein the tensioning device has at least one tensioning position and at least one release position. The drive pulley and the output pulley in the tensioning position have a first spacing relative to one another and in the release position have a second smaller spacing.

U.S. Pat. No. 4,977,708 discloses a power tool with a two-part extension arm. A tensioning device acts between the two sections of the extension arm and, by means of a pressure spring, is secured in its end positions, i.e., an inoperative position and an operative position.

SUMMARY OF THE INVENTION

The invention has the object to provide a power tool of the aforementioned kind whose tensioning device has a simple configuration.

This object is solved for a power tool of the aforementioned kind in that the belt is an elast belt and in that the tensioning device as a result of the tension of the elast belt is secured in the tensioning position.

So-called elast belts are known that have a high inherent tension and maintain it during their service life. These elast belts are used, for example, in the automotive field and must not be retensioned. Mounting of such an elast belt is however comparatively complex because during mounting the belt must be expanded against its inherent tension.

By using an elast belt in connection with a tensioning device that has a tensioning position and a release position, a simple mounting and demounting can be achieved, on the one hand, and the configuration of the tensioning device can be simplified, on the other hand, because the elast belts itself can secure the tensioning device in the tensioning position. In this way, an additional spring that secures the tensioning device in its tensioning position is not needed anymore. In this way, a simple and lightweight configuration of the tensioning device is achieved. In the release position the belt can be easily mounted without great force expenditure.

Advantageously, the tool is arranged on an extension arm. In particular, at least one section of the extension arm is longitudinally movable relative to a housing of the power tool wherein on the housing the drive pulley and on the section of the extension arm the output pulley is arranged, respectively. In this connection, it can be provided that the entire extension arm is arranged to be longitudinally movable relative to the housing of the power tool. However, it can also be advantageous that the extension arm is of a two-part configuration and the section of the extension arm on which the tool is arranged is longitudinally movably arranged relative to a second section of the extension arm that is secured on the housing.

Advantageously, the tensioning device has a tensioning element that acts on a pressure element wherein one of the two elements, tightening element and pressure element, is connected to the housing and the other to the movable section of the extension arm.

A simple configuration results when the tensioning element is embodied as an eccentric and rotatably supported eccentric cam. By means of the eccentric cam in a simple way different spacings of drive pulley and output pulley can be realized. Advantageously, the eccentric cam is supported on a bolt of a clamping device of the tensioning device wherein the bolt is configured as a fastening bolt. A clamping device can be advantageous in order to secure the position of the extension arm relative to the housing in the tensioning position. In that the eccentric cam is supported on a fastening bolt of the clamping device, an additional bolt for supporting the eccentric cam is not needed. The number of required components and the weight of the tensioning device are reduced. However, it can also be provided that the eccentric cam is supported on a bolt that is embodied as a bearing pin and is fixedly connected to the housing. The bearing pin can be screwed into the housing, for example. Fasting bolts of the clamping device and the bearing pin of the eccentric cam are thus separately embodied components.

In order to define locking positions of the tensioning device, it is provided that the eccentric cam has at least one recess in which the pressure elements rests in one position of the tightening element. The recess formed advantageously on the circumference of the eccentric cam defines in a simple way a locking position. By means of the depth of the recess the required force for adjusting the tensioning element can be adjusted. In order to determine the rotational direction in which the tensioning element can be rotated into the locking position or out of the locking position, a stop can be additionally provided, particularly on an edge of the recess on which the spacing of the circumference of the eccentric cam relative to the axis of rotation of the eccentric cam is enlarged. In this way, the stop delimits the rotational movability of the eccentric cam. Several such tensioning positions can be provided in order to realize different belt tensions or an adjustment to different belt sizes and can be formed, for example, by several recesses at the circumference of the eccentric cam.

Advantageously, the eccentric cam acts by a pushrod on the pressure element wherein the pushrod is longitudinally movably guided in a guide. In this way, the position of clamping element and pressure element can be adjusted to the mounting situation of the power tool and the available space can be utilized well.

Advantageously, the tensioning element acts by means of an actuating rod on the pressure element wherein the actuating rod is connected with at a first end to the pressure element and with the second end to the tensioning element. Expediently, both ends of the actuation rod are pivotably supported. In order to define terminal positions of the tensioning device it is provided that the second end of the actuating rod in the tensioning position is positioned on a first side of the connecting line of the first end of the actuating rod to the axis of rotation of the tensioning element and in the release position is positioned on the opposite, second side of the connecting line. When the second end of the actuating rod is arranged on the connecting line, the greatest force for acting on the tensioning device is provided. From this central position, the actuating element as a result of the tension of the belt is moved to the first or the second side of the connecting line. Advantageously, a stop for the tensioning element is provided against which the tensioning element rests in the tensioning position. A simple configuration results when the tensioning device is arranged in a receptacle of the extension arm and the stop is provided by a wall of the receptacle.

In order to achieve a space-saving arrangement of the tensioning device it is provided that the tensioning device is arranged in a receptacle inside the belt loop of the belt.

Expediently, the tensioning device has an adjusting element that is embodied as a rotatable adjusting knob. The adjusting knob can be actuated by the operator from the exterior of the extension arm by hand or by means of a suitable tool. Advantageously, on the adjusting knob there is additionally a marking provided that indicates whether the tensioning device is arranged in the tensioning position or the release position. In order to achieve a minimum number of components it is provided that the tensioning element is formed on the adjusting knob.

Expediently, the power tool has a clamping device that secures the movable section of the extension arm relative to the housing. The clamping device has in this connection advantageously at least one, expediently several, bolts each arranged in a slotted hole. In this connection, the bolts can be embodied as screws and screwed into a thread at the housing or as a threaded bolt onto which a nut is screwed in order to secure the extension arm on the housing.

BRIEF DESCRIPTION OF THE DRAWINGS

FIG. 4 shows the tensioning device of FIG. 3 in release position.

FIG. 5 is a schematic side view of an embodiment of an eccentric cam for the tensioning device of FIG. 3 in tensioning position.

FIG. 6 shows the eccentric cam of FIG. 5 in release position.

FIG. 7 is a schematic side view of an embodiment of an eccentric cam in tensioning position.

FIG. 8 shows the eccentric cam of FIG. 7 in release position.

DESCRIPTION OF PREFERRED EMBODIMENTS

Figure 1:
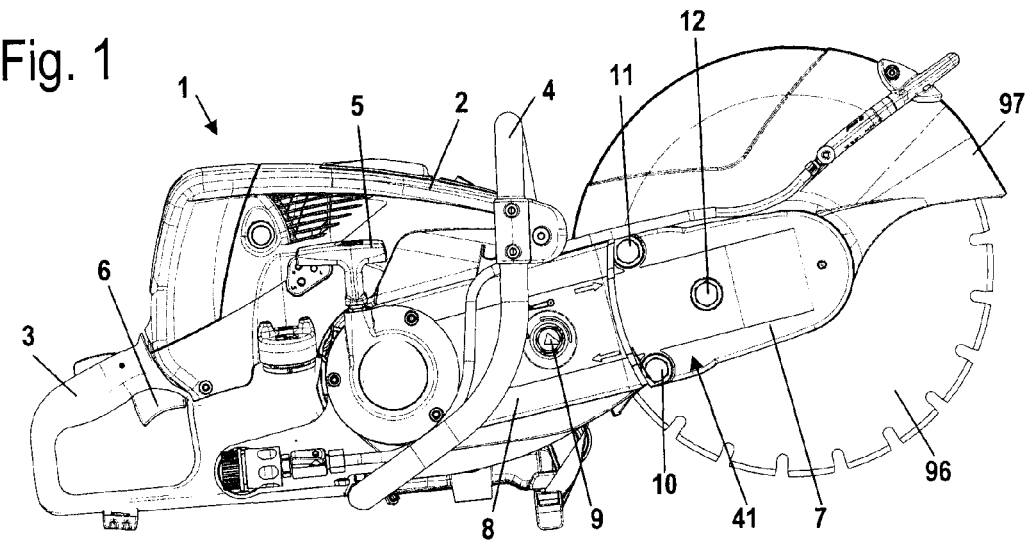
FIG. 1 shows a side view of a cut-off machine.

Same reference numerals indicate in all Figures the same elements.

FIG. 1 shows a hand-guided portable power tool, i.e., a cut-off machine 1, as an embodiment of a power tool. The power tool can also be, for example, a rotary hoe or another power tool with a tool that is driven by a belt. The cut-off machine 1 has a housing 2 on which a rear handle 3 and a grip pipe 4 are arranged. A starter handle 5 of a starter device projects from the housing 2 of the cut-off machine 1. The cut-off machine has an extension arm 7 that relative to the housing 2 is longitudinally movable. The extension arm 7 is covered in the area of the housing 2 by a cover 8. In the area of the cover 8 a turn knob 9 projects to the exterior. The extension arm 7 can be secured relative to the housing 2 by means of a clamping device 41 that comprises advantageously three bolts 10, 11, 12. The bolts 10, 11, 12 are advantageously embodied as fastening bolts. At the rear handle 3 a throttle trigger 6 is pivotably supported. The cut-off machine 1 has a cut-off wheel 96 as a tool that is covered across a portion of its circumference by a protective cover 97. The protective cover 97 is secured on the extension arm 7.

Figure 2:
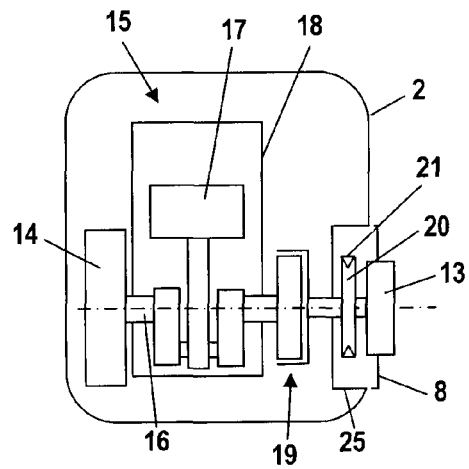
FIG. 2 is a schematic section illustration of the housing of the cut-off machine of FIG. 1.

FIG. 2 shows that in the housing 2 a drive motor 15 is arranged that is embodied as an internal combustion engine in this embodiment. The drive motor 15 is advantageously a two-stroke engine or a mixture-lubricated four-stroke engine. The drive motor 15 has a cylinder 18 in which a piston 17 is reciprocatingly supported. The piston 17 drives the crankshaft 16 in rotation. On the crankshaft 16 a fan wheel 14 is fixedly secured. On the opposite side of the drive motor 15 a centrifugal clutch 19 is arranged by means of which the crankshaft 16 is connected to a drive pulley 20 of a belt drive. The belt 21 is guided by means of the drive pulley 20. For starting the drive motor 15 a starter device 13 is provided that comprises the handle 5 illustrated in FIG. 1. The starter device 13 causes the drive pulley 20 and, by means of the centrifugal clutch 19, the crankshaft 16 to rotate. The drive pulley 20 is arranged in the area of the housing part 25 and covered on the exterior of the housing by the cover 8 and a housing part of the starter device 13.

Figure 3:
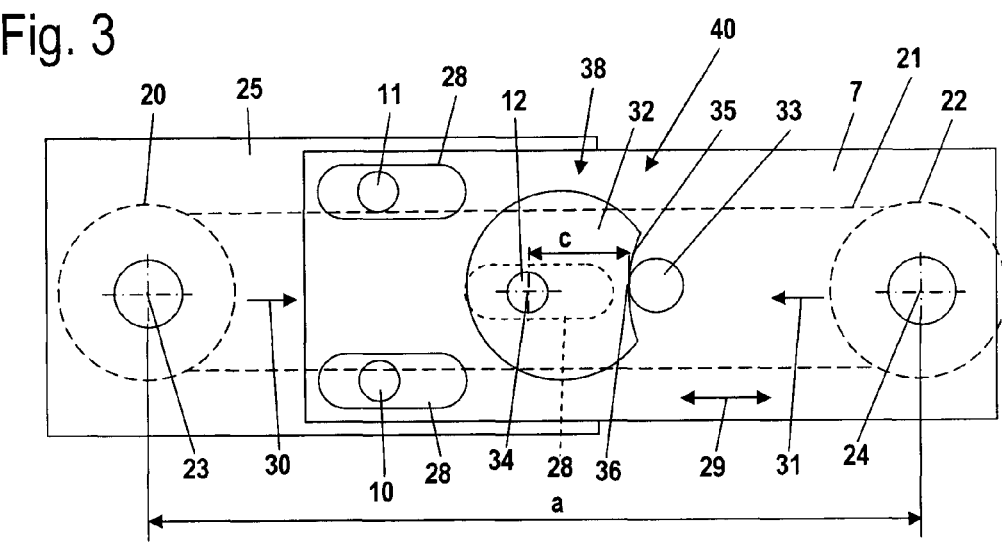
FIG. 3 is a schematic side view of a tensioning device for the cut-off machine of FIG. 1 in tensioning position.

As shown in FIG. 3, the belt 21 is guided about the drive pulley 20 and the output pulley 22. The output pulley 22 is arranged on the end of the extension arm 7 facing away from the housing 2. The output pulley 22 drives a drive spindle, not illustrated, on which the cut-off wheel 96 is secured. The drive pulley 20 is rotatably supported about axis of rotation 23 and the output pulley 22 about axis of rotation 24.

As shown in FIG. 3, the extension arm 7 has three slotted holes 28 extending in the longitudinal direction of the extension arm 7 through which the bolts 10, 11, 12 project. In this way, the extension arm 7 is longitudinally movable relative to the housing part 25 when the clamping device 41 is released. The housing part 25 can also be a section of the extension arm 7 when the extension arm 7 is of a two-part configuration. The bolts 10, 11, 12 are advantageously screws that are screwed into threaded bores of the housing part 25. The bolts 10, 11, 12 however can also be threaded bolts that are fixedly connected to the housing part 25 onto which nuts are screwed for fixation of the extension arm 7. The belt 21 is an elast belt. Elast belts have a high elasticity and inherent tension so that they must not be retensioned. The elast belt 21 exerts on the drive pulley 20 a force in the direction of arrow 30 and onto the output pulley 22 a force in the direction of arrow 31 so that the two belt pulleys are pulled toward one another by the belt 21.

The cut-off machine 1 has a tensioning device 40 with which the spacing of the drive pulley 20 and of the output pulley 22 is adjustable. In FIG. 3, the tensioning device 40 is shown in a tensioning position 38 in which the axis of rotation 23 of the drive pulley 20 relative to the axis of rotation 24 of the output pulley 22 has a spacing a. The tensioning device 40 comprises an eccentric cam 32 which is pivotably supported on the bolt 12 about pivot axis 34. The eccentric cam 32 is thus rotatably secured on the housing part 25. A bolt 33 secured on the extension arm 7 rests on the outer circumference of the eccentric cam 32. As a result of the inherent tension of the belt 21 the extension arm 7 with the bolt 33 is forced against the eccentric cam 32.

It can also be provided that the clamping device 41 comprises only two bolts 10, 11 that are embodied as fastening bolts. A third bolt 12 is then not embodied as a fastening bolt but as a bearing pin that serves in particular for supporting the eccentric cam 32.

In the tensioning position 38 illustrated in FIG. 3 the bolt 33 rests in a recess 35 of the outer circumference of the eccentric cam 32. The eccentric cam 32 has a substantially circular outer periphery that in the area of the recess 35 is concavely recessed. The recess 35 can also be embodied as a flattened portion. As a result of the recess 35, there is no continuous enlargement of the spacing between the momentary contact location of the bolt 33 and the pivot axis 34 when the eccentric cam 32 is rotated. Up to the edge of the recess 35 the spacing increases and thus also the force required for rotation of the eccentric cam 32 and then decreases in the recess. In this way, a defined excess tension for contact of the bolt 33 at the edge of the recess 35 and a defined locking position in the position of the eccentric cam 32 in which position the bolt 33 is resting in the recess 35 at that location that has minimum spacing relative to the axis of rotation 34 are provided.

The bolt 33 is positioned in the tensioning position 38, representing a locking position of the eccentric cam 32, at a first contact location 36 at the circumference of the eccentric cam 32 that has a spacing c relative to the pivot axis 34. For adjusting the tensioning device 40, first the clamping device 41 must be released. When doing so, the extension arm 7 is movable in the direction of double arrow 29 relative to the housing part 25. From the tensioning position 38 illustrated in FIG. 3 the eccentric cam 32 can be rotated in both rotational directions, i.e., in FIG. 3 either to the right or the left. Since the spacing between the pivot axis 34 and the outer circumference of the eccentric cam 32 first increases, an increased force must be applied in order to move the eccentric cam 32 out of the tensioning position 38 shown in FIG. 3. In this way, the eccentric cam 32 is secured by the belt 21 in the tensioning position 38. As soon as the bolt 33 upon rotation of the eccentric cam 32 by the operator has reached the circular area of the outer circumference of the eccentric cam 32, the spacing between the contact position and the pivot axis 34 decreases. The eccentric cam 32 is rotated by the belt 21 into the release position 39 illustrated in FIG. 4.

In the release position 39 the bolt 33 rests against a second contact location 37 on the outer circumference of the eccentric cam 32. The contact location 37 has relative to the pivot axis 34 a spacing d that is significantly smaller than the spacing c in the tensioning position 38. In this embodiment the spacing d is the minimal spacing between the pivot axis 34 and the bolt 33.

In FIG. 4, the belt 21 has moved the extension arm 7 toward the housing part 25. The spacing of the axis of rotation 23 of the drive pulley 20 to the axis of rotation 24 of the output pulley 22 has been reduced to a spacing b. As a result of the reduced spacing b between the two belt pulleys 20, 22 the belt tension in the belt 21 has been reduced so that in the release position 39 illustrated in FIG. 4 the belt 21 is comparatively easily removable and a new belt 21 can be mounted. After a new belt 21 has been mounted, the eccentric cam 32 is rotated by the operator again into the tensioning position 38 shown in FIG. 3. The eccentric cam 32 can advantageously be embodied integrally with the turn knob 9 illustrated in FIG. 1 so that for operating the tensioning device 40 no additional components are required. This is indicated in FIG. 4 in dashed lines.

FIGS. 5 and 6 show an embodiment of an eccentric cam 42 that can be employed instead of the eccentric cam 32. The eccentric cam 42 has a substantially circular outer circumference that on opposite sides has recesses 44, 45. In the tensioning position 58 shown in FIG. 5, the bolt 33 is arranged at a first contact location 46 in the first recess 44 that has relative to the pivot axis 34 a maximum spacing c. In the release position 39 shown in FIG. 6 the bolt 33 is arranged in the recess 45 positioned on the opposite side at a second contact location 47. The second contact location 47 has relative to the pivot axis 34 a minimal spacing d. In that the contact locations 46 and 47 are arranged in recesses 44, 45, locking points of the tensioning device 40 are defined in both positions 38 and 39. In the release position 39 the belt 21 can still be under minimal tension so that the tensioning device 40 is also secured by the force of belt 21 in the release position 39.

In FIG. 6, additionally a third recess 71 is shown that defines a further tensioning position. In the recess 71 the bolt 33 rests against a contact location 77 that has relative to the pivot axis 34 a spacing i. The spacing i deviates from the spacing d and can be greater or smaller than it. As a result of the different spacings d, i several tensioning positions are possible in which the belt 21 is tensioned with different strength. In this way, the belt tension can be adjusted in a simple way by selecting a suitable position of the eccentric cam 42. It can be advantageous to provide further recesses on the eccentric cam 42 that define further tensioning positions with other belt tensions so that a good adjustment of the belt tension is possible.

FIGS. 7 and 8 show a further embodiment of an eccentric cam 52. The eccentric cam 52 has a center point 53 that is positioned with eccentricity e relative to the pivot axis 34. The eccentric cam 52 has a first section 48 with a first radius f and a second section 51 with a second radius g. The second radius g is greater than the first radius f. The two sections 48 and 51 are positioned opposite one another. Between the sections 48 and 51 a recess 54, 55 is arranged, respectively, that each define a locking position of the eccentric cam 52. In section 48 further recesses for further locking positions can be provided.

In the tensioning position 38 shown in FIG. 7 the bolt 33 is arranged at a first contact location 56 in the first recess 54. The contact location 56 has a spacing c relative to the pivot axis 34. In the area that adjoins the second section 51 a first stop 58 is arranged so as to adjoin the recess 54. In this way, the eccentric cam 52 can be pivoted only in the direction of arrow 98. In this pivot direction the bolt 33 will come to rest against the first section 48. It can be advantageous to arrange the stop 58 such that the bolt 33 when arranged at the first contact location 56 rests against the first stop 58. The stop 58 defines in this way the locking position and forms a terminal stop that prevents further rotation of the eccentric cam opposite to the direction of the arrow 98.

In the release position 39 shown in FIG. 8 the bolt 33 is arranged on a contact location 57 in the recess 55. The recess 55 is formed substantially as a flattened portion and recessed only slightly relative to the first section 48. In the release position 39 the bolt 33 has relative to the pivot axis 34 a spacing d that is significantly smaller than the spacing c. Adjoining the recess 55 there is also a stop 59 on the side of the recess 55 facing the second section 51. In this way, the eccentric cam 52 can be pivoted only in the direction of the arrow 99 out of the release position 39. Upon pivoting in the opposite direction the bolt 33 will come to rest against the stop 59 and a further rotation of the eccentric cam 52 is not possible or possible only with a disproportionately great force expenditure. By means of the stops 58 and 59 the rotational direction of the eccentric cam 52 can be constructively fixed in a simple way. In this connection, the eccentric cam 52 is adjustable in a first rotational direction into the release position 39 and in opposite direction into the tensioning position 38.

Figure 9:
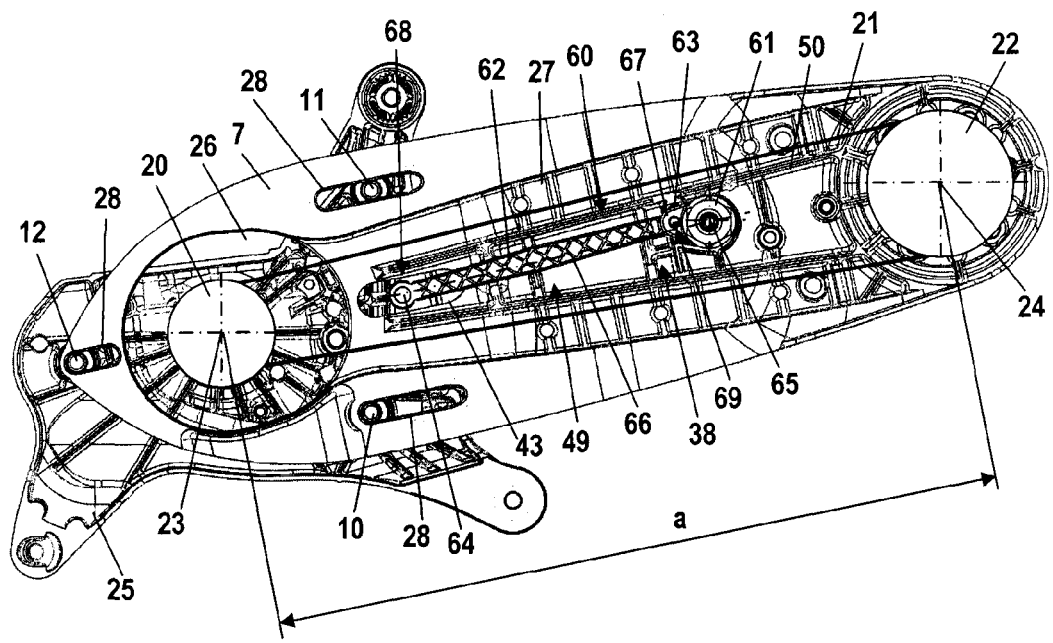
FIG. 9 shows an embodiment of a tensioning device in tensioning position in a side view.
Figure 10:
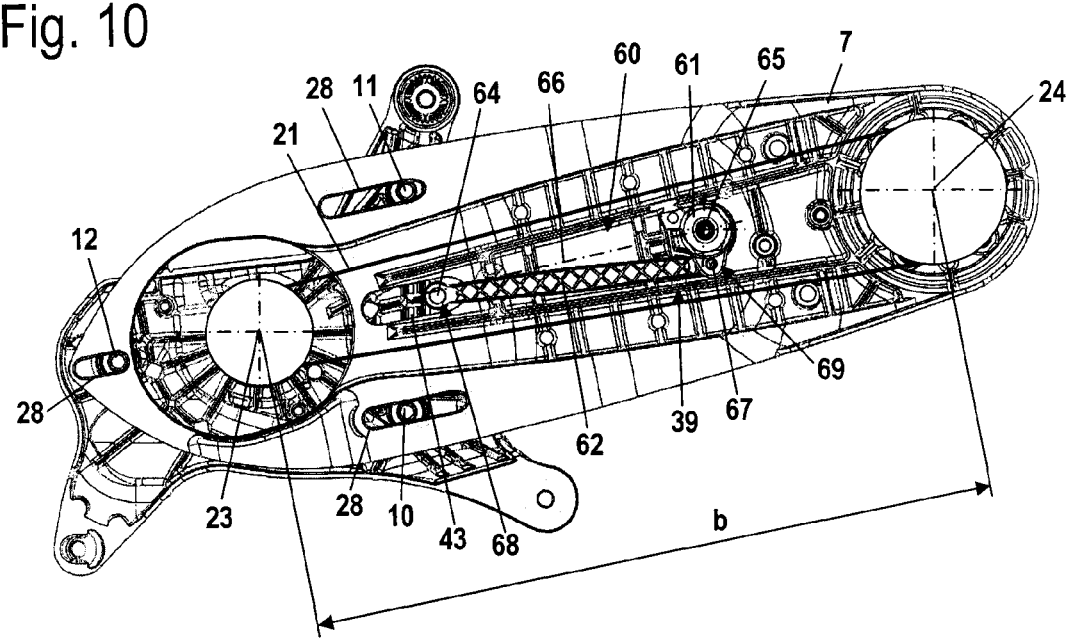
FIG. 10 shows the tensioning device of FIG. 9 in release position.

FIGS. 9 and 10 show an embodiment of a tensioning device 60. In FIG. 9 the housing part 25 and the extension arm 7 are shown also. In the embodiment according to FIG. 9 the bolt 12 is arranged on the side of the drive pulley 20 facing away from the output pulley 22. The extension arm 7 is embodied integrally and has in the area of the drive pulley 20 an opening 26 through which the drive shaft, not shown in FIG. 9, for the drive pulley 20 projects. The extension arm 7 has two guide grooves 27 in which the belt 21 is guided. Between the two guide grooves 27 there is a receptacle 49 for the tensioning device 60. The tensioning device 60 comprises an adjusting knob 61 and an actuating rod 62 that is pivotably supported with the second end 69 on a fastening lug 67 of the adjusting knob 61. With its opposite first end 68 the actuating rod 62 is pivotably supported on a bolt 64 of the housing part 25. The bolt 64 projects through a cutout 43 that is embodied as a large slotted hole. The actuating rod 62 is also pivotably supported on the bolt 64.

FIG. 9 shows the tensioning device 60 in the tensioning position 38. In this position the fastening lug 67 rests against a stop 63 that is formed by a wall 50 delimiting the receptacle 49. The second end 69 is positioned in the illustration of FIG. 9 above a connecting line 66 that connects the first end 68 with the axis of rotation 65 of the adjusting knob 61. The belt 21 forces as a result of its inherent elasticity of the first end 68 on the bolt 64 in the direction toward the axis of rotation 65 of the adjusting knob 61. In this way, the fastening lug 67 is forced against the stop 63. The fastening lug 67 is arranged on the side of the axis of rotation 65 facing the bolt 64. The tensioning device 60 is thus secured by the inherent tension of the belt 21 embodied as an elast belt in the tensioning position 38. In the tensioning position 38 the axes of rotation 23 and 24 of the drive pulley 20 and the output pulley 22 have a spacing a relative to one another.

FIG. 10 shows the tensioning device 60 in the release position 39. In this position the axes of rotation 23 and 24 have a spacing b relative to one another that is smaller than the spacing a. In this way, the belt 21 is loosened and can be mounted or demounted in a simple way. In the release position 39 the adjusting knob 61 is rotated about axis of rotation 65 relative the tensioning position 38 in counterclockwise direction. The fastening lug 67 is below the connecting line 66, i.e., on the opposite side of the connecting line 66. In this position, the fastening lug 67 can pivot to the level of the axis of rotation 65 so that the fastening lug 67, viewed in the longitudinal direction of the extension arm 7, is father removed from bolt 64 than in the tensioning position 38 and a reduced spacing between the axes of rotation 23 and 24 results. As shown in FIGS. 9 and 10, the bolts 10, 11, and 12 move in the slotted holes 28 upon movement of the extension arm 7 in its longitudinal direction. In the release position 38 the fastening rod 62 is slanted more strongly relative to the longitudinal direction of the extension arm 7 than in a tensioning position 39.

On the extension arm 7 the cut-off wheel 96 shown in FIG. 1 is arranged. As shown in FIG. 1, the cut-off wheel 96 is usually arranged on the inner side of the extension arm 7 facing the housing 2. In order to be able to perform cuts near lateral boundaries, the cut-off wheel 96 can also be arranged on the outer side of the extension arm 7 that is facing away from the housing 2. For this purpose, the entire extension arm 7 with the cut-off wheel 96 is rotated by 180 degrees about its longitudinal axis. For this purpose, the bolts 10, 11, and 12 or the fastening nuts arranged on the bolts 10, 11, 12 are released. The tensioning device 60 is moved into the release position 39. It is then possible to release the belt 21 and to remove the extension arm 7 with the belt 21, the output pulley 22, and the cut-off wheel 96 from the housing part 25 and to rotate the extension arm 7 about its longitudinal axis such that the side of the extension arm 7 that in FIGS. 9 and 10 is positioned in front and faces away from the housing part 25 rests against the housing part 25. The tensioning device 60 is also rotated together with the extension arm 7. Subsequently, the belt 21 is again arranged on the drive pulley 20, the tensioning device 60 is moved into the tensioning position 38 and the bolts 10, 11 and 12 or the corresponding fastening nuts are tightened so that the extension arm 7 is secured fixedly on the housing parts 25. The design of the tensioning device 60 enables the rotation of the extension arm 7 in a simple way. This is possible likewise for all described tensioning devices 40, 60, 70, 80.

Figure 11:
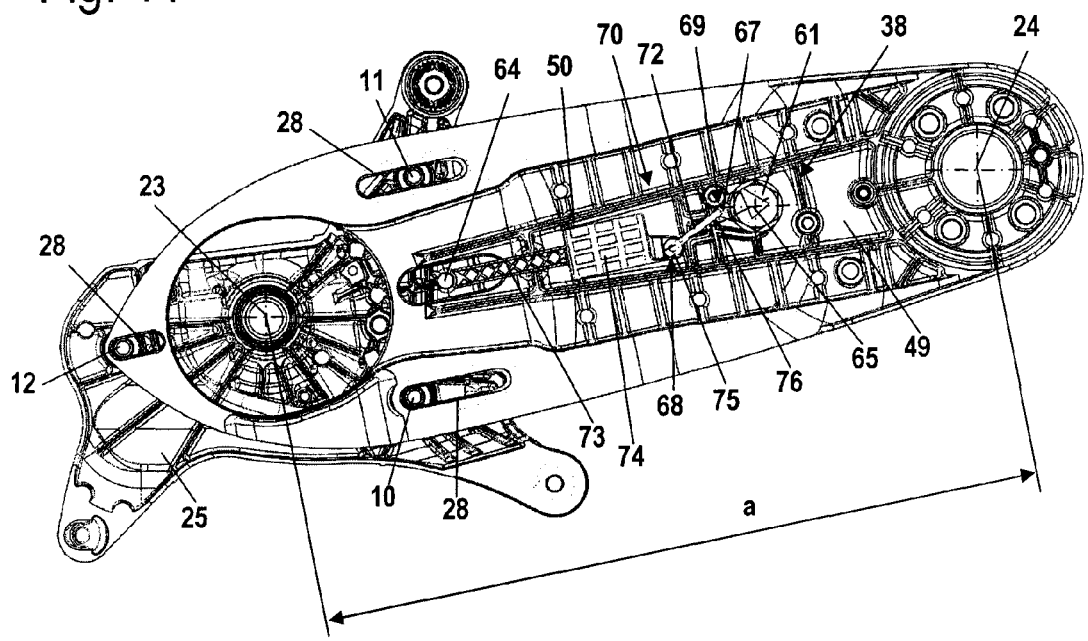
FIG. 11 shows an embodiment of a tensioning device in tensioning position in a side view.
Figure 12:
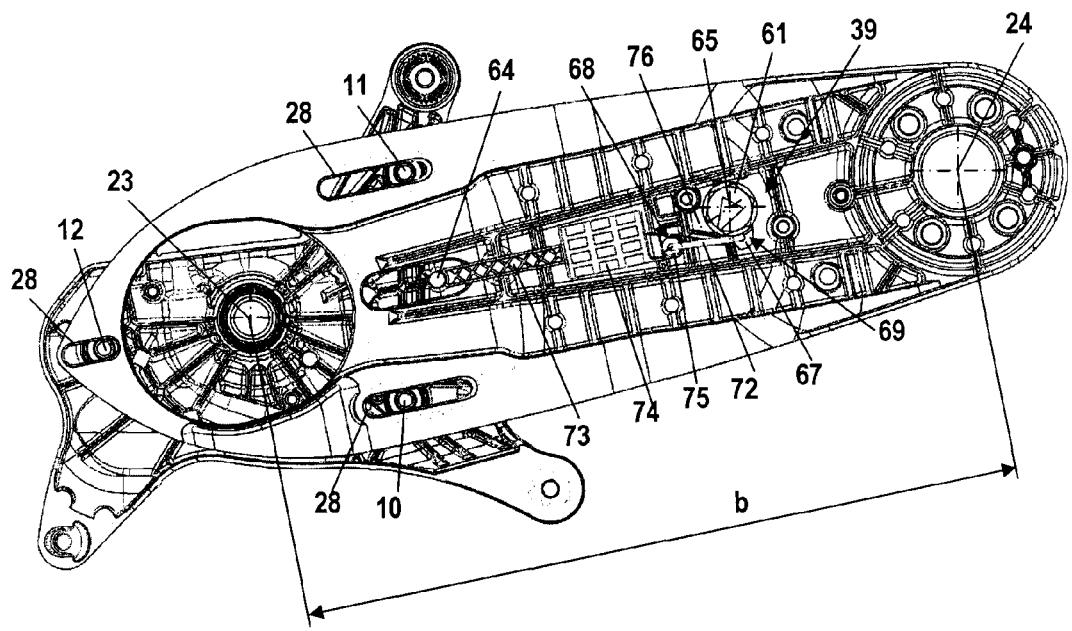
FIG. 12 shows the tensioning device of FIG. 11 in release position.

In the embodiment of a tensioning device 70 illustrated in FIGS. 11 and 12 there is also an adjusting knob 61 provided that is rotatable about axis of rotation 65. On the adjusting knob 61 an actuating rod 72 is pivotably supported with a second end 69. The other first end 68 of the actuating rod 72 is pivotably supported on a fastening lug 75 of a push rod 73. The push rod 73 acts on the bolt 64 on the housing part 25. The push rod 73 has a guide area 74 with enlarged diameter that is guided on the extension arm 7 between the walls 50 extending in the longitudinal direction of the receptacle 49.

In the tensioning position 38 illustrated in FIG. 11 in which the axes of rotation 23 and 24 have a spacing a relative to one another, the fastening lug 67 is positioned with the second end 69 of the fastening rod 17 on a first side of a connecting line 76 between the first end 68 and the axis of rotation 65. Advantageously, the fastening lug 67 in this position rests against a stop, not shown in FIG. 11.

In the release position 39 that is illustrated in FIG. 12 the second end 69 with the fastening lug 67 is positioned in the opposite position, shown in the illustration of FIG. 12 below the connecting line 76. The fastening lug 67 is positioned in the release position 39 approximately at the level of the axis of rotation 65 or on the side of the axis of rotation 65 facing away from the first end 68. In the tensioning position 38 illustrated in FIG. 11 the fastening lug 67 is positioned between the axis of rotation 65 and the first end 68 relative to the connecting line 76. In this way, the spacing between the first end 68 and the axis of rotation 65 in the release position 39 is less than in the tensioning position 38. The reduced spacing has the effect that the belt 21, not shown in FIG. 12, moves the extension arm 7 with the output pulley 22 toward the drive pulley 20. The pulleys 20 and 22 are not shown in FIGS. 11 and 12.

Figure 13:
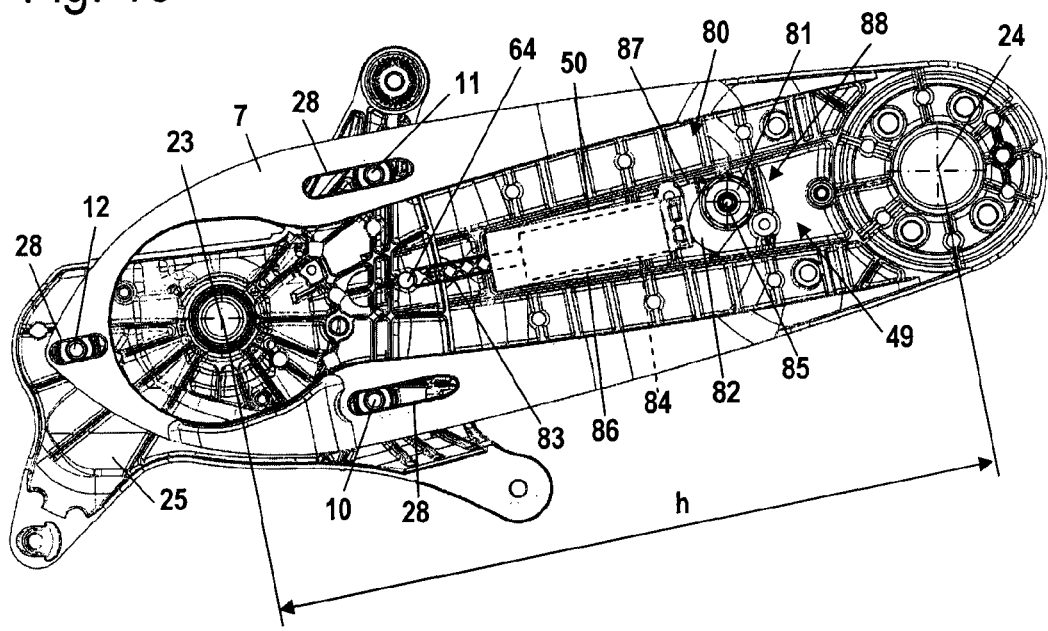
FIG. 13 is a side view of a tensioning device in a central position.
Figure 14:
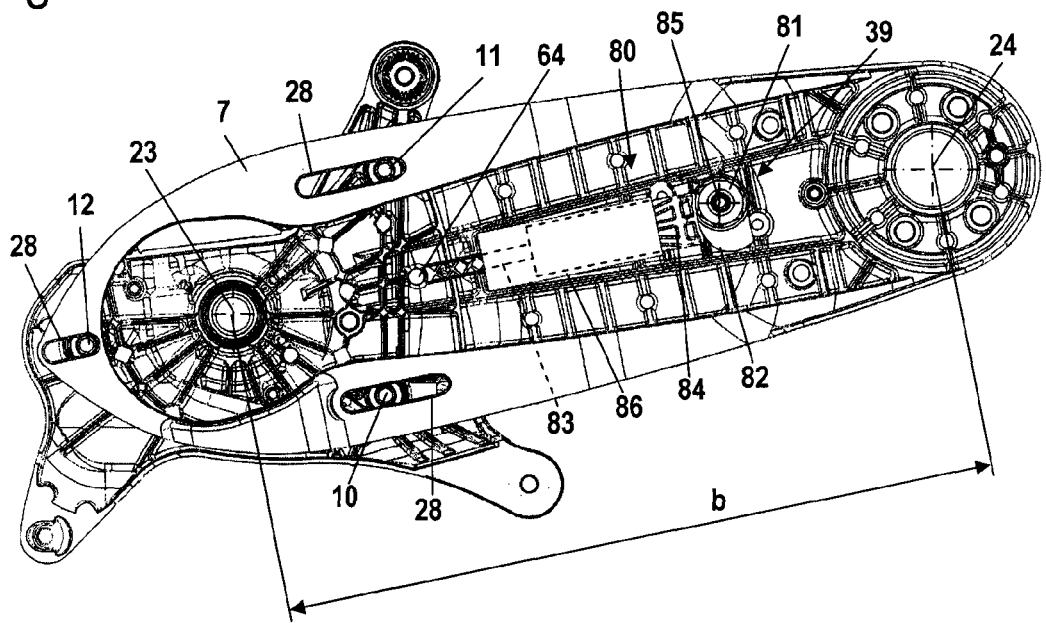
FIG. 14 shows the tensioning device of FIG. 13 in release position.

In the embodiment illustrated in FIGS. 13 and 14 a tensioning device 80 is provided. The tensioning device 80 has an adjusting knob 81 on which an eccentric cam 80 is integrally formed. The adjusting knob 81 is supported rotatably about axis of rotation 85 on the extension arm 7. On the bolt 64 of the housing part 25 a pushrod 83 is arranged that has a guide area 84 with widened diameter. The guide area 84 is guided longitudinally in a guide 86. The guide 86 can be embodied, for example, as a sleeve in the receptacle 49 of the extension arm 7. The eccentric cam 82 which pushrod acts on the end face of the pushrod 83 facing the eccentric cam 82 that is embodied on the guide area 84. FIG. 13 shows the tensioning device 80 in an intermediate position 88. Upon further movement of the adjusting knob 81 in clockwise direction in FIG. 13 the eccentric cam 82 contacts the wall 50 of the receptacle 49 where a stop 87 is formed. Now the tensioning device 80 is in the tensioning position. In the intermediate position 88 shown in FIG. 13 the axes of rotation 23 and 24 have a spacing h relative to one another that is smaller than the spacing a in the tensioning position 38 but greater than the spacing b in the release position 39 illustrated in FIG. 14.

As shown in FIG. 14, the eccentric cam 82 in this position rests against the guide area 84 with an area that has a minimal spacing relative to the axis of rotation 85. Upon rotation of the eccentric cam 82 out of the release position 39 shown in FIG. 14 in clockwise direction, the spacing of the circumference of the eccentric cam 82 to the axis of rotation 85 increases continuously so that the pushrod 83 is pushed away from the axis of rotation 85 against the tension of the belt 21, not shown in FIGS. 13 and 14. In this way, the belt 21 is tensioned. In the tensioned position 39 the eccentric cam 82 rests against the pushrod 83 in such a way that the belt 21 on the eccentric cam 82 exerts a torque relative to the axis of rotation 85 in the clockwise direction, i.e., in the direction of the tensioning position 39. In this way, the tensioning device 80 is held in this position as a result of the force of the belt 21. For releasing the tensioning device 80 the adjusting knob 81 must be rotated opposite to the clockwise direction and against the force of the elast belt 21 until it reaches first the intermediate position 88 shown in FIG. 13 and then the release position 39 illustrated in FIG. 14.

The specification incorporates by reference the entire disclosure of German priority document 10 2008 023 927.5 having a filing date of May 16, 2008.

While specific embodiments of the invention have been shown and described in detail to illustrate the inventive principles, it will be understood that the invention may be embodied otherwise without departing from such principles.

What is claimed:

1. A power tool comprising:
   a drive motor;
   a drive belt guided about a drive pulley and an output pulley;
   a tool driven by said drive motor through said drive belt;
   a tensioning device adapted to change a spacing between said drive pulley and said output pulley and having at least one tensioning position and at least one release position, wherein said drive pulley and said output pulley in said at least one tensioning position have a first spacing relative to one another and in said at least one release position have a second spacing to one another that is smaller than said first spacing;
   wherein said drive belt is an elast belt and wherein said tensioning device as a result of an inherent tension of said elast belt is secured in said at least one tensioning position;
   wherein, for release of said tensioning device, said tensioning device is actuated against the force of said elast belt;
   wherein said tensioning device has a tensioning element acting on a pressure element, wherein one of said tensioning element and said pressure element is connected to a housing of the power tool and the other one of said tensioning element and said pressure element is arranged on a movable section of an extension arm of the power tool;
   wherein said tensioning element is an eccentrically and rotatably supported cam;
   wherein said tensioning element in said at least one tensioning position acts on said pressure element; and
   wherein said tensioning element, when moving said tensioning device from said at least one tensioning position into said at least one release position, acts on said pressure element such that said first spacing between said drive pulley and said output pulley is enlarged and said elast belt is further tensioned before said second spacing between said drive pulley and said output pulley is reached.

2. The power tool according to claim 1, wherein said tool is arranged on said extension arm.

3. The power tool according to claim 2, wherein said moveable section of said extension arm is longitudinally movably arranged relative to said housing, wherein said drive pulley is arranged on said housing and said output pulley is arranged on said movable section of said extension arm.

4. The power tool according to claim 3, further comprising a clamping device that secures said at least one section of said extension arm relative to said housing.

5. The power tool according to claim 4, wherein said clamping device comprises at least one bolt arranged in a slotted hole.

6. The power tool according to claim 1, wherein said tensioning element acts through an actuating rod on said pressure element, wherein said actuating rod has a first end connected to said pressure element and a second end connected to said tensioning element.

7. The power tool according to claim 6, wherein said first and second ends of said actuating rod are pivotably supported.

8. The power tool according to claim 6, wherein said second end of said actuating rod is arranged in said at least one tensioning position on a first side of a connecting line that connects said first end of said actuating rod and an axis of rotation of said tensioning element, and is arranged, in said at least one release position, on a second opposite side of said connecting line.

9. The power tool according to claim 1, comprising a stop for said tensioning element on which said tensioning element rests in said at least one tensioning position.

10. The power tool according to claim 9, wherein said tensioning device is arranged in a receptacle of said extension arm and wherein said stop is formed by a wall of said receptacle.

11. The power tool according to claim 1, wherein said tensioning device is arranged in a receptacle inside a belt loop of said drive belt.

12. The power tool according to claim 1, wherein said tensioning device comprises an adjusting element that is embodied as a rotatable adjusting knob.

13. The power tool according to claim 12, wherein said tensioning device comprises a tensioning element that is formed on said adjusting knob.

14. The power tool according to claim 1, wherein said elast belt in said at least one release position is loosened and can be mounted and demounted in a simple way.

15. A power tool comprising:
   a drive motor;
   a drive belt guided about a drive pulley and an output pulley;
   a tool driven by said drive motor through said drive belt;
   a tensioning device adapted to change a spacing between said drive pulley and said output pulley and having at least one tensioning position and at least one release position, wherein said drive pulley and said output pulley in said at least one tensioning position have a first spacing relative to one another and in said at least one release position have a second spacing to one another that is smaller than said first spacing;
   wherein said drive belt is an elast belt and wherein said tensioning device as a result of an inherent tension of said elast belt is secured in said at least one tensioning position;
   wherein, for release of said tensioning device, said tensioning device is actuated against the force of said elast belt;
   wherein said tensioning device has a tensioning element acting on a pressure element, wherein one of said tensioning element and said pressure element is connected to a housing of the power tool and the other one of said tensioning element and said pressure element is arranged on a moveable section of an extension arm of the power tool;
   wherein said tensioning element is an eccentrically and rotatably supported eccentric cam;

wherein said eccentric cam in said at least one tensioning position acts on said pressure element and said pressure element is resting on a contact location of said eccentric cam in said at least one tensioning position, wherein said contact location has a distance relative to a pivot axis of said eccentric cam;

wherein, when moving said tensioning device from said at least one tensioning position into said at least one release position, said distance of said contact location to said pivot axis initially increases and then decreases.

16. The power tool according to claim 15, wherein said tensioning device comprises a clamping device and wherein said eccentric cam is supported on a bolt of said clamping device, wherein said bolt is a fastening bolt.

17. The power tool according to claim 15, wherein said eccentric cam is supported on a bolt that is fixedly connected to said housing and is a bearing pin.

18. The power tool according to claim 15, wherein said eccentric cam has at least one recess and said pressure element rests in said recess in one position of said tensioning element.

19. The power tool according to claim 15, wherein said eccentric cam has at least one stop that delimits a rotational movability of said eccentric cam.

20. The power tool according to claim 15, wherein said eccentric cam acts through a pushrod on said pressure element, wherein said pushrod is longitudinally movably guided in a guide.

21. A power tool comprising:
a drive motor;
a drive belt guided about a drive pulley and an output pulley;
a tool driven by said drive motor through said drive belt;
a tensioning device adapted to change a spacing between said drive pulley and said output pulley and having at least one tensioning position and at least one release position, wherein said drive pulley and said output pulley in said at least one tensioning position have a first spacing relative to one another and in said at least one release position have a second spacing to one another that is smaller than said first spacing;

wherein said drive belt is an elast belt and wherein said tensioning is secured in said at least one tensioning position device only by an inherent tension of said elast belt, with no spring being provided that secures said tensioning device in said at least one tensioning position;

wherein, for release of said tensioning device, said tensioning device is actuated against the force of said elast belt;

wherein said tensioning device has a tensioning element acting on a pressure element, wherein one of said tensioning element and said pressure element is connected to a housing of the power tool and the other one of said tensioning element and said pressure element is arranged on a movable section of an extension arm of the power tool;

wherein said tensioning element in said at least one tensioning position acts on said pressure element; and wherein said tensioning element, when moving said tensioning device from said at least one tensioning position into said at least one release position, acts on said pressure element such that said first spacing between said drive pulley and said output pulley is enlarged and said elast belt is further tensioned before said second spacing between said drive pulley and said output pulley is reached.

* * * * *